Aug. 10, 1965   I. C. RUBIN   3,199,228
WORD TRAINING AID
Filed April 30, 1962
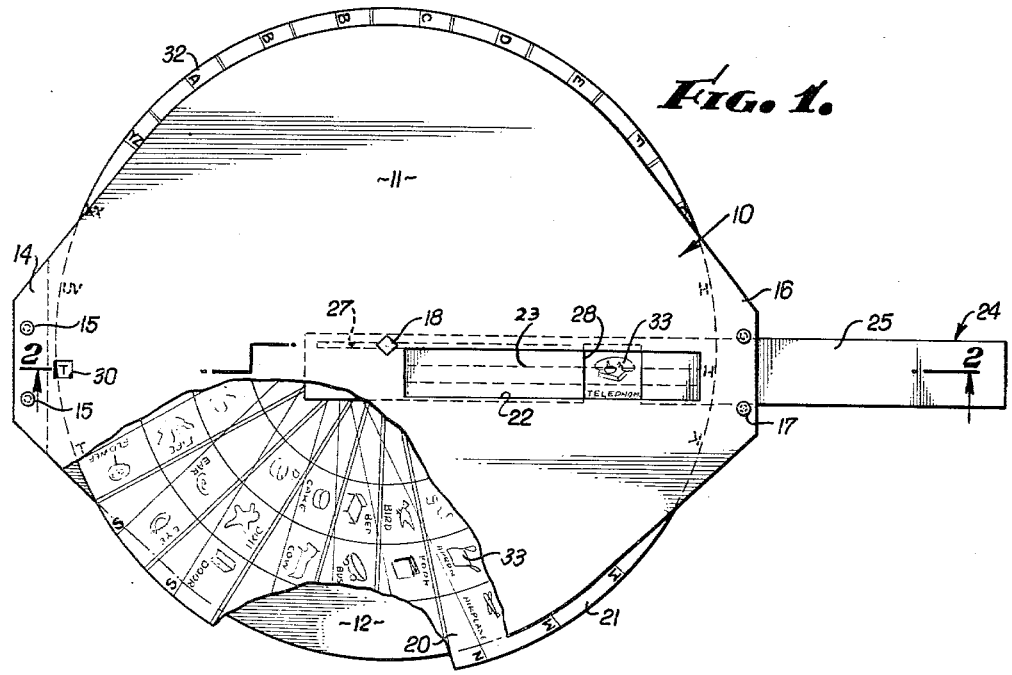
INVENTOR.
*Irving C. Rubin*
BY
*Edward C. Walsh*
ATTORNEY.

United States Patent Office 3,199,228
Patented Aug. 10, 1965

3,199,228
WORD TRAINING AID
Irvin C. Rubin, 1822 Oak Tree Drive, Eagle Rock, Calif.
Filed Apr. 30, 1962, Ser. No. 190,872
5 Claims. (Cl. 35—35)

This invention relates to educational devices and more especially to a dial-type device for use in teaching children word recognition and spelling by the identification of named objects.

The earliest literary training of children is usually object-identification and word-forming, and word-forming is customarily associated with an identification of an object, the name of which is usually the word portrayed. A common method of teaching spelling is the use of a series of cards or book pages, portions thereof depicting a number of objects the name of which is printed in association with the picture, either above, below, adjacent or at the side of the picture. This method has the disadvantage that the word or name of the object is always in view when the picture is before the child, and no exercise of the memory is used which is important in developing the ability to learn the word which is the name of the object. A further disadvantage of this method is that it does not provide any ready means for recognizing or identifying the particular object which is named by the word.

Another common teaching technique for learning word formation is to drill the student orally and verbally. This method has been extensively used in the past but has not proven to be particularly efficacious. Some children can learn very readily by this method but many are not so adept and a more satisfactory method is needed for such children.

Of late it has been quite clearly established that the best method of word training is the visual association of an object with the word which names it and the present invention has been conceived and developed to achieve this end. This is done by visual portrayal of a number of objects and a number of words identifying the objects but not positioned in direct association therewith but so placed that either the word or the object is initially seen separated from the other so that exercise of the mental faculty is necessary in the child in an attempt to identify the particular counterpart of the word or the object.

The method of carrying out this invention is the provision of a dial-type chart or device of the circular slide rule type wherein the major portion of the dial is covered or concealed by the card or sheets forming a top cover for the device but having a window through which the objects can be seen.

The device also has a double slider which has a small opening or window in each leg through which one object and it sassociated identification may be seen. The device also has a similar window in the back sheet or cover similar to the first, through which the identifying word on the face of the disc may be seen which identifies the object reigstering with the window thereof.

In a varied form of the device the slider as mentioned above is itself provided with a second slider having a window or aperture so formed as to permit revealing the several letters of the word, one at a time, for assistance in developing skill in spelling in addition to the word formation itself.

In view of the foregoing it is the major purpose and objective of this invention to provide an improved device of simple design having a minimum number of components or parts however capable of effective use in teaching spelling and word formation.

Another object of the invention is to provide a simple dial-type device for teaching a child spelling and word formation and which can be operated with facility for teaching object identification and word formation by association.

Another object of the invention is to produce a novel dial-type device for the teaching of spelling and word formation by visual association, wherein the object and its identifying name or word are not visible at the same time and therefore require the exercise of mental training or memory to effect the teaching.

A further object of the invention is to provide an improved and novel dial-type word teaching device having but two moveable elements which can be actuated to provide correlated information regarding two logically related subjects.

A further object of the invention is to provide a device as in the previous objects having but three moveable parts to accomplish the same end in a more effective manner.

It is yet an additional object of the invention to provide a novel word teaching apparatus, as in the previous objects, but with the additional feature of expediting the teaching of spelling of the words which are the names of the objects portrayed.

Other objects and advantages will appear and will be brought out more fully in the following specification reference being had to the accompanying drawing.

In the drawing:

FIGURE 1 is a top or face view of a dial-type device embodying one form of the present invention.

FIGURE 2 is a sectional view of the same taken along line 2—2 of FIG. 1.

FIGURE 3 is a view, partly broken away, similar to FIG. 2, showing a modified form of the invention.

FIGURE 4 is a sectional view taken along the line 4—4 of FIG. 3.

FIGURE 5 is a separate perspective view of the slider element shown in FIGS. 3 and 4.

Referring more particularly to the drawing and especilaly FIGS. 1 and 2, there is there shown a word training device embodying one form of the invention comprising a two-part circular element 10 formed of a pair of sheets or plates of suitable material, such as paperboard or opaque plastic, having an upper part 11 and a lower part 12 disposed in slightly spaced arrangement, such as by a spacer element 13 between radial extension 14 of the sheets 11 and 12 and secured together as by rivets 15 or other equivalent securing means. The sheets 11 and 12 have diametrically opposite radial extensions 16 through which extend holding rivets 17. At the center of the circular element is a rivet 18 forming pivot for a disc 20, which has a peripheral portion 21 of somewhat larger diameter than that of the parts 11 and 12 of the circular element 10. Upper part 11 has a radial slot 22 and lower part 12 has a radial slot 23 opposite slot 22. Slot 23 is narrower as shown.

A slider element 24 is slidably disposed between disc 20 and the upper and lower parts 11 and 12. It preferably comprises an elongated thin strip of suitable material having a comparative degree of stiffness, such as paper board, Celluloid, plastic or the like, folded over itself at the middle thereof forming an upper part 25 and a lower part 26, which parts are formed with elongated slots 27 extending along one edge thereof and through which the pivot pin 18 extends. Slider 24 is disposed between the two rivets 17 which together with slots 27 provide guides for the longitudinal movement of the slider. In a modified form of the invention rivets 17 may be omitted and parts 11 and 12 comprise a single folded-over slotted sheet.

The upper portion 25 of the slider has a small aperture 28 forming a window and the lower part 26 of the slider has a correspondingly disposed window or aperture 29. At a substantially radially opposite position along the diametrical line of the slider 25, window apertures 30 and 31 are formed respectively in the upper and lower parts 11 and 12 of the circular element 10, these apertures are being above or below, respectively, the peripheral portions 21 of the rotary disc 20 which bear indicia 32 which are the several letters of the alphabet, in the spaced relation, circumferentially, so as to register in association with indicia 33 and visible through the apertures 30 and 31. The two sides of disc 20 are provided with indicia 33, disposed in several circumferential bands, these indicia being of a size and spacing to substantially register with either window aperture 28 or 29 of the slider, the several elements of the indicia representing or depicting common and familiar objects, such as a cat, cow, dog, door, bed, flower, telephone and the like.

FIGS. 3, 4 and 5 show a modified form of slider for use with the device of FIGS. 1 and 2, the slider being indicated as 34 and having upper and lower portions 35 and 36 generally similar to parts 25 and 26 of slider 24. The upper part 35 has a slot or window aperture 37 similar to aperture 28, extending nearly the width of the slider, and part 36 has a smaller and narrower window or aperture 38 similar to aperture 29. A rivet 39 extends through the slider parts near the central and folded end portion thereof, and provides a guide for a second slider element 40 which has a narrow end portion which extends through an aperture 41 in the folded end portion of slider 34.

Slider 40 has a slot 42 through which rivet 39 extends and an elongated slot 43 near its opposite end through which central rivet and pivot 18 extends. Slider 40 has a window aperture 44 which is substantially the size of aperture 37 at one end and is smaller at its other end forming a cover or shield portion 45 which covers aperture 37 in the position shown in FIGS. 3, 4 and 5. When the slider 40 is shifted to the right as shown in dotted outline in FIG. 4, the aperture 44 is aligned with the full width portion of window 37 and the indicia on disc 20 opposite window 37 will be visible. As can be seen in FIG. 3, slider 40 is above disc 20 and the indicia thereon which would be opposite shield 45 is not visible when the shield is above that indicia.

The operation of the invention is as follows. Disc 20 is freely rotatable and the various items of indicia 33 become visible when opposite slot 22 or 23 and when exposed by the window aperture 28 or 29 in upper and lower parts 25 and 26 of the slider 24. In one exemplification of the invention the indicia 33 on both sides of the disc on a radial line will be related to objects, the names of which have the same first letter such as, door, doll and drum, and when this radial strip is opposite slots 22 and 23 the marginal indicia 32 letter D will be visible through windows 30 and 31.

In this form of the invention as shown in FIG. 1, the indicia 33 on one side of the disc will be a graphical representation of a telephone with the written word telephone and on the opposite side of the disc the word TELEPHONE alone will appear. If now slider 24 is moved from its most inward radial position outwardly so that the graphical representation appears in window 28, the word telephone will appear alone in window 29. Thus by setting words in window 29, the child can check this reading by looking in window 28. Slot 23 being narrower exposes only the word.

The operation of the modification of FIGS. 3 to 5 is generally similar to that of FIGS. 1 to 2. In this form of the invention the indicia on one side of the disc visible through window 44 will be a graphical representation of a telephone, for example, in the upper portion and the word TELEPHONE in the lower portion which will be covered by the cover or shield portion of 45 of the slider 40 while at the same time the word TELEPHONE will appear on the disc on the opposite side thereof through a narrow window 38. A child upon seeing only the picture of the telephone can verify his identification of it by seeing the word through aperture 38 and verify his spelling of it by moving the slider 40 to the right to disclose the several letters comprising the word one at a time.

It will be understood that the foregoing description is illustrative rather than restrictive of the invention and that changes and modificaions may be made without departing from the spirit and scope of the subjoined claims.

What is claimed is:

1. An educational device comprising: a two-part circular element, means fixedly securing the two parts together axially spaced relation, each of said parts having a radial slot, a coaxial rotatable disc between said parts having a greater diameter than said circular element, a two-leg slider radially slidable between said circular element parts with one leg on each side of said rotatable disc and having apertures respectively simultaneously registrable with said circular element slots, said disc having correlated indicia on opposite sides thereof simultaneously visible through said slots and apertures.

2. A device as set forth in claim 1 wherein all of said indicia visible at any selected position of said disc and slider is related, indicia on one side being pictorial and having words associated therewith and symbols on the opposite side being only said words.

3. An educational device comprising a circular element having indicia thereon arranged in circular bands, said indicia comprising symbols and radially positioned words associated therewith, a circular masking element and means whereby said elements are relatively rotatable, the said masking element having a radial slot, a sliding masking element slidable along said slot, the said sliding masking element having an aperture in it whereby by means of the masking elements, an individual indicia in an individual one of said circular bands of indicia may be exposed through the slot in the circular masking element and the aperture in the sliding masking element, a second radially movable masking slider separately slidable along said slot and having an opening therein which by radial movement of said second slider can be brought into registry with the aperture in said first radially movable masking slider whereby to be operable to expose or conceal indicia visible through said aperture.

4. A device as in claim 3 wherein the said opening in said second radially movable slider is of irregular shape providing a square shoulder whereby said second radially movable slider may be moved to sequentially expose the letters of a word positioned radially on said first circular element letter by letter.

5. A device as in claim 1 including a second radially movable slider, movable along one of said legs and having an aperture in it cooperating with said two leg slider whereby its aperture may be brought into registry with the aperture in said one leg whereby indicia otherwise visible through the aperture in the two leg slider may be completely exposed or partially concealed by movement of the second slider.

References Cited by the Examiner

UNITED STATES PATENTS

| 1,641,982 | 9/27 | McDade | 35—31.5 |
| 2,797,499 | 7/59 | Lagerdahl | 35—31.1 |
| 2,906,037 | 9/59 | Rubin | 35—74 X |
| 2,932,909 | 4/60 | Bosco | 35—74 |
| 2,965,980 | 12/60 | Day | 35—31.1 |

JEROME SCHNALL, *Primary Examiner.*

L. SMILOW, *Examiner.*